United States Patent
He et al.

(10) Patent No.: US 10,570,318 B2
(45) Date of Patent: Feb. 25, 2020

(54) COMPOSITE ARTICLE

(71) Applicant: BASF SE, Ludwigshafen am Rhein (DE)

(72) Inventors: Xiaojun He, Hackettstown, NJ (US); Jesse Jefferis, Wayne, MI (US); Stephen J. Hanley, Lebanon, NJ (US); James G. Gillick, Akron, OH (US); Lauren E. Brace, Cleveland, OH (US)

(73) Assignee: BASF SE, Ludwigshafen am Rhein (DE)

( * ) Notice: Subject to any disclaimer, the term of this patent is extended or adjusted under 35 U.S.C. 154(b) by 86 days.

(21) Appl. No.: 15/537,721

(22) PCT Filed: Dec. 18, 2015

(86) PCT No.: PCT/US2015/066675
§ 371 (c)(1),
(2) Date: Jun. 19, 2017

(87) PCT Pub. No.: WO2016/100817
PCT Pub. Date: Jun. 23, 2016

(65) Prior Publication Data
US 2018/0273807 A1    Sep. 27, 2018

Related U.S. Application Data

(60) Provisional application No. 62/094,637, filed on Dec. 19, 2014.

(51) Int. Cl.
*C09J 5/00* (2006.01)
*C09J 7/25* (2018.01)
*C09J 7/22* (2018.01)

(52) U.S. Cl.
CPC . *C09J 7/25* (2018.01); *C09J 5/00* (2013.01); *C09J 7/22* (2018.01); *C09J 2451/006* (2013.01);
(Continued)

(58) Field of Classification Search
CPC .............. C09J 2451/006; C09J 2461/00; C09J 2477/006; C09J 2479/02; C09J 2479/026; C09J 5/00; C09J 7/22; C09J 7/25
See application file for complete search history.

(56) References Cited

U.S. PATENT DOCUMENTS 3,226,276 A    12/1965    Rye et al.
3,268,467 A    8/1966    Rye et al.
(Continued)

FOREIGN PATENT DOCUMENTS

JP    S40-17131    3/1965
JP    S48-35607    3/1973
(Continued)

OTHER PUBLICATIONS

International Search Report for Application No. PCT/US2015/066675 dated Apr. 6, 2016, 4 pages.
(Continued)

*Primary Examiner* — Lawrence D Ferguson
(74) *Attorney, Agent, or Firm* — DLA Piper LLP (US)

(57) ABSTRACT

A composite article comprises a base layer and an adhesive layer disposed thereon. The base layer comprises the reaction product of a polyamide and an anhydride-functional copolymer, and an ionomer. The adhesive layer comprises a cationic polymer and an adhesive.

19 Claims, 1 Drawing Sheet

(52) U.S. Cl.
CPC ...... *C09J 2461/00* (2013.01); *C09J 2477/006* (2013.01); *C09J 2479/02* (2013.01); *C09J 2479/026* (2013.01)

(56) References Cited

U.S. PATENT DOCUMENTS

| | | | |
|---|---|---|---|
| 3,298,984 | A | 1/1967 | Rye |
| 3,305,430 | A | 2/1967 | Hennemann |
| 3,449,200 | A | 6/1969 | Kalafus et al. |
| 3,716,396 | A | 2/1973 | Shirano et al. |
| 4,928,741 | A | 5/1990 | Rye et al. |
| 5,040,583 | A | 8/1991 | Lin et al. |
| 5,395,891 | A | 3/1995 | Orbrecht et al. |
| 5,466,424 | A | 11/1995 | Kusano et al. |
| 5,672,639 | A | 9/1997 | Corvasce et al. |
| 6,127,488 | A | 10/2000 | Obrecht et al. |
| 6,133,364 | A | 10/2000 | Obrecht et al. |
| 6,207,757 | B1 | 3/2001 | Obrecht et al. |
| 6,242,534 | B1 | 6/2001 | Obrecht et al. |
| 6,372,857 | B1 | 4/2002 | Obrecht et al. |
| 6,608,125 | B2 | 8/2003 | Cruse et al. |
| 7,714,051 | B2 | 5/2010 | Hahn |
| 8,021,728 | B2 | 9/2011 | Soeda et al. |
| 8,454,778 | B2 | 6/2013 | Majumdar et al. |
| 2003/0130535 | A1 | 7/2003 | Deschler et al. |
| 2014/0150947 | A1 | 6/2014 | Shannon et al. |

FOREIGN PATENT DOCUMENTS

| | | |
|---|---|---|
| JP | H09-165469 | 6/1997 |
| JP | H 11-222779 A | 8/1999 |
| JP | 2001-003273 A | 1/2001 |
| KR | 2013-0077480 A | 7/2013 |
| WO | WO 2007-081323 A1 | 7/2007 |
| WO | WO 2014/164054 A1 | 10/2014 |

OTHER PUBLICATIONS

BASF, "Safety Data Sheet—Lupasol P", Aug. 19, 2014, pp. 1-9.
BASF, "Technical Bulletin—Lupasol P Polyethylenimine", 2009, 1 page.
Mitsui Chemicals Group, "Tafmer PN-2060-Propylene Based Elastomer", Dec. 2011, 1 page.
Mitsui Chemicals Group, "Tafmer MH5020-Acid Modfied Polyolefinr", Dec. 2013, 1 page.
English language abstract and machine-assisted English translation for JPH 11-222779 extracted from espacenet.com database on Jun. 28, 2017, 14 pages.
English language abstract and machine-assisted English translation for JP 2001-003273 extracted from espacenet.com database on Jun. 28, 2017, 11 pages.
English language abstract and machine-assisted English translation for KR 2013-0077480 extracted from espacenet.com database on Jun. 28, 2017, 33 pages.
Notification of Reasons for Refusal from counterpart Japanese Patent Application No. 2017-533181 dated Dec. 3, 2019, and comments.

COMPOSITE ARTICLE

CROSS-REFERENCE TO RELATED APPLICATIONS

The present application is the National Stage of International Patent Application No. PCT/US2015/066675, filed on Dec. 18, 2015, which claims priority to and all the benefits of U.S. Provisional Patent Application No. 62/094,637, filed on Dec. 19, 2014, which is hereby expressly incorporated herein by reference in its entirety.

FIELD OF THE DISCLOSURE

The present disclosure generally relates to a composite article comprising a base layer and an adhesive layer.

BACKGROUND OF THE DISCLOSURE

Many polymeric materials are known in the art to exhibit low permeability. Permeability is a measurement of the amount of permeate (e.g. gas, liquid) that penetrates the polymeric material in a specific time, dependent on the type of permeate, pressure, temperature, thickness and surface area of an article formed from these polymeric materials. These polymeric materials can be used in food packaging, in recreational objects (e.g. as bladders in balls, rafts, floats), in pneumatic tires (e.g. as inner liners in automobiles, trucks, tractors, recreational vehicles, etc.), and in a wide array of other commercial products. Despite the availability of polymer materials having relatively low permeability, there remains a need for polymeric materials that are impermeable and also durable, resilient, temperature resistant, light weight, and receptive to bonding by various polymers.

SUMMARY OF THE DISCLOSURE AND ADVANTAGES

The instant disclosure provides a composite article including a base layer and an adhesive layer disposed thereon. The base layer comprises the reaction product of a polyamide and an anhydride-functional copolymer, and an ionomer. The adhesive layer comprises a cationic polymer and an adhesive.

The instant disclosure also provides a method of forming the composite article including the base layer and the adhesive layer disposed thereon. The method comprises the step of compounding a polyamide composition comprising the polyamide, the anhydride-functional copolymer, and the ionomer to form the base layer comprising the reaction product of the polyamide and the anhydride-functional copolymer and the ionomer. The method also comprises the step of applying the cationic polymer and the adhesive to the base layer to form the adhesive layer thereon.

The composite article of the subject disclosure is impermeable, flexible, durable, temperature resistant, and light weight (e.g. includes lower density than other polymeric materials such as filled polymer compositions). The base layer comprises the reaction product of the polyamide and the anhydride-functional copolymer which are covalently bonded and durable as well as the ionomer which forms an ionic complex, e.g. ionic bonds, with the reaction product of the polyamide and the anhydride-functional copolymer further contributing to strength and structural resilience of the inner liner. Because the ionomer interacts ionically with the reaction product of the polyamide and the anhydride-functional copolymer, the base layer exhibits homogeneity and improved physical properties. The adhesive layer provides a surface which is flexible, durable, and receptive to bonding by various polymers.

BRIEF DESCRIPTION OF THE DRAWINGS

Other advantages of the present invention will be readily appreciated, as the same becomes better understood by reference to the following detailed description when considered in connection with the accompanying drawings.

FIGS. 1 and 2 are exemplary in nature and are not drawn to scale and are, thus, not intended to represent the relative sizes of the various components of the composite article, e.g. the base layer, the adhesive layer, the friction generating particles, the fibrillated nanofibers, the natural rubber latex layer, etc.

DETAILED DESCRIPTION OF THE DISCLOSURE

Figure 1:
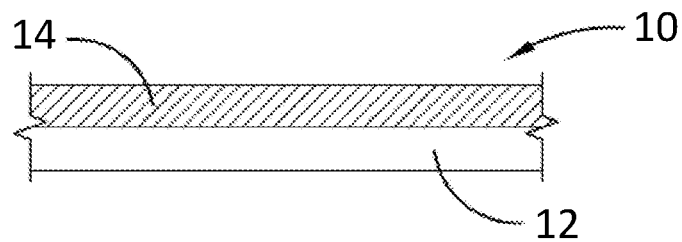
FIG. 1 is an enlarged cross-sectional view of a composite article.

Referring to the FIG. 1, wherein like numerals indicate corresponding parts throughout the several views, a composite article is generally shown at 10. The composite article 10 comprises a base layer 12 and an adhesive layer 14 disposed thereon. The composite article 10 can be used in food packaging, as bladders in balls, rafts, floats, and in a wide array of other commercial products. In one embodiment, the composite article 10 is incorporated into a tire build for use as an inner liner in a pneumatic tire. It is to be appreciated that the composite article 10 of the subject disclosure can also have applications not specifically set forth herein.

The base layer 12 is formed from a polyamide composition and comprises the reaction product of a polyamide and an anhydride-functional copolymer, and an ionomer. Specifically, the polyamide composition comprises a polyamide, an anhydride-functional copolymer reactive with the polyamide, a poly (ethylene-co-methacrylic acid) ionomer, and, in one embodiment, a synthetic wax.

The polyamide composition comprises one or more polyamides. In some embodiments, the polyamide comprises one or more polyamides selected from the group of polyamide 6, polyamide 6,6, polyamide 6/66, polyamide 6/12, polyamide 12, polyamide 6/11, and combinations thereof. In some embodiments, the polyamide comprises one or more polyamides selected from the group of polyamide 6, polyamide 6,6, polyamide 6/66, and combinations thereof. Polyamide 6 is also known as polycaprolactam and is commercially available from BASF Corporation under the trade names ULTRAMID® B, ULTRAMID® B27, ULTRAMID® B32, ULTRAMID® B33, ULTRAMID® B36, ULTRAMID® B36 LN, ULTRAMID® B40 L, and ULTRAMID® B40 LN. Polyamide 66 is the reaction product of hexamethylene diamine and adipic acid and is commercially available from BASF Corporation under the trade names ULTRAMID® A, ULTRAMID® A27 E 01, ULTRAMID® A34 01, and ULTRAMID® A44 01. Polyamide 6/66 is a co-polymer of polyamide 6 and polyamide 66 and is commercially available from BASF Corporation under the trade name of ULTRAMID® C, ULTRAMID® C33 01, ULTRAMID® C33L 01, ULTRAMID® C33LN 01, ULTRAMID® C40 L 01, and ULTRAMID® C40LX 01.

In some embodiments, the polyamide is typically present in the polyamide composition in an amount of from about 30 to about 75, alternatively from about 35 to about 70, alternatively from about 45 to about 65, parts by weight per 100 parts by weight of the polyamide composition. Further, it is to be appreciated that more than one polyamide may be included in the polyamide composition, in which case the total amount of all polyamides present in the polyamide composition is within the above ranges.

As described above, the polyamide composition also comprises an anhydride-functional copolymer, which reacts with the polyamide. By "anhydride-functional" copolymer it is meant that the copolymer is contacted with an anhydride-functional group, under various conditions, to cause all or part of the functional group to incorporate, graft, bond to, physically attach to, and/or chemically attach to the copolymer. That is, the "anhydride-functional" comprises an anhydride-functional group. The anhydride-functional copolymer is reactive with the polyamide. That is, the anhydride-functional group of the anhydride-functional copolymer reacts with the amino end groups of the polyamide to form a reaction product which can be referred to as a graft copolymer. As one example, the anhydride-functional copolymer can be a copolymer having anhydride-functionality grafted thereon, as is described above. As another example, the anhydride-functional copolymer can be the polymerization product of an anhydride functional moiety. That is, "anhydride-functional" is also defined to include copolymers directly polymerized from monomers comprising olefin monomers and a monomer containing an anhydride functional group, (or using initiators having a functional group) to produce a copolymer having an anhydride functional group. As yet another example, the anhydride-functional copolymer can be the reaction of an acid anhydride and peroxide with an α-olefin copolymer.

Examples of particularly preferred anhydride functional groups include, but are not limited to, maleic anhydride, phthalic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, itaconic anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid anhydride, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

In various embodiments, the anhydride-functional copolymer comprises a maleic anhydride modified copolymer. In these embodiments, the copolymer can comprise less than 5, alternatively less than 4, alternatively less than 3, alternatively less than 2, alternatively from about 0.2 to about 2.5, alternatively from about 0.2 to about 2, alternatively from about 0.2 to about 1.5, parts by weight maleic anhydride per 100 parts by weight of the copolymer.

In various embodiments, the anhydride-functional copolymer comprises a maleic anhydride modified α-olefin graft copolymer. For example, in some embodiments, the anhydride-functional copolymer comprises a maleic anhydride modified α-olefin graft copolymer, ethylene-propylene copolymer, an ethylene-butene copolymer, an ethylene-hexene copolymer, and an ethylene-octene copolymer, and combinations thereof. In one embodiment, the anhydride-functional copolymer comprises an α-olefin graft copolymer comprising the reaction product of ethylene and 1-octene, grafted with units derived from maleic anhydride. In one embodiment, the α-olefin graft copolymer is a copolymer of ethylene and a second α-olefin, and the α-olefin graft copolymer is grafted with an anhydride of an α, β-unsaturated carboxylic acid. In one particular embodiment, the anhydride-functional copolymer comprises a maleic anhydride modified ethylene-octene copolymer.

In a specific embodiment, the anhydride-functional copolymer is formed by grafting maleic anhydride onto a saturated copolymer, typically via extrusion. Maleic anhydride-functional polymers are preferred because of the high reactivity of the maleic anhydride group with the amino group of the polyamide. In one embodiment, the anhydride-functional copolymer is a maleic anhydride modified ethylene-octene copolymer. In one embodiment, the maleic anhydride modified ethylene-octene copolymer of this embodiment comprises melt-grafted maleic anhydride and is further defined as having a linear molecular structure. In another embodiment, the maleic anhydride modified ethylene-octene copolymer of this embodiment comprises melt-grafted maleic anhydride and is further defined as having a branched molecular structure.

In this embodiment, the physical properties, e.g. low temperature impact strength and high elongation at break, of the base layer 12 can be attributed to (1) good dispersion of the maleic anhydride modified ethylene-octene copolymer (impact modifier), (2) chemical interaction between the maleic anhydride modified ethylene-octene copolymer and the polyamide and (3) the low crystallinity of the maleic anhydride modified ethylene-octene copolymer.

Without being bound by theory, in this particular embodiment, dispersion and reaction of the maleic anhydride modified ethylene-octene copolymer is influenced by the viscosities of both the polyamide and the maleic anhydride modified ethylene-octene copolymer and the method of mixing (compounding). The viscosities can be measured by melt index or capillary rheometry methods. The chemical interaction between the maleic anhydride modified ethylene-octene copolymer and the polyamide, e.g. the chemical reaction between the maleic anhydride and the amine end groups of the polyamide, allows for transfer of impact stresses from the relatively rigid polyamide to the elastic maleic anhydride modified ethylene-octene copolymer.

Ethylene octene copolymers with higher octene content have lower crystallinity, which improves low temperature impact strength. Ethylene-octene copolymers including less than 0.2% by weight maleic anhydride typically have inferior low temperature impact strength.

In various embodiments, the anhydride-functional copolymer is a maleic anhydride modified ethylene-butene copolymer. In one embodiment, the polyolefin is nano-crystal polypropylene having a crystal size of about 50 nm. In this embodiment, the nano-crystal polypropylene has an tensile strength at break of about 19 MPa (or greater than 19 MPa) and an elongation at break of about 100% (or greater than 100%) when tested in accordance with ASTM D38. The nano-crystal polypropylene of this embodiment has a melting point of about 160° C. and becomes brittle at about −28° C.

In some embodiments, the polyamide composition comprises anhydride functional compatibilizers and blends thereof. For example, in one embodiment, the polyamide composition comprises a compatibilizer blend comprising a maleic anhydride modified ethylene-butene copolymer.

In some embodiments, the anhydride-functional copolymer is present in the polyamide composition in an amount of from about 5 to about 55, alternatively from about 8 to about 45, alternatively from about 8 to about 35, alternatively from about 8 to about 20, parts by weight per 100 parts by weight of the polyamide composition. Further, it is to be appreciated that more than one anhydride-functional copolymer may be included in the polyamide composition, in which case the total amount of all anhydride-functional copolymers present in the polyamide composition is within the above ranges.

As described above, the polyamide composition also comprises an ionomer, such as a poly (ethylene-co-methacrylic acid) ionomer. The ionomer is added to the polyamide composition to improve the durability (abrasion resistance), flexibility, tensile properties, and performance properties over a range of temperatures of the base layer 12 formed therefrom. Without being bound by theory, it is believed that the ionomer further introduces "ionic" crosslinking, which is typically thermally reversible, through the metal ions. The properties that the ionomer imparts on the base layer 12 are partially dependent on the properties of the other components of the polyamide composition, e.g. the polyamide and the maleic anhydride functional polymer, as well as the processing parameters under which the base layer 12 is formed.

The ionomer is typically produced by copolymerizing an olefin and a carboxylic acid to produce a copolymer having the acid units randomly distributed along the polymer chain. In some instances, an additional monomer such as acrylic ester may be incorporated to form a terpolymer. For example, a terpolymer may be produced by polymerizing an olefin, an acrylate, and a carboxylic acid. Suitable olefins for use in preparing the ionomeric resins include, but are not limited to, ethylene, propylene, butene-1, hexene-1, and the like. Unsaturated carboxylic acids include, but are not limited to, acrylic, methacrylic, ethacrylic, α-chloroacrylic, and the like. Suitable acrylates for use in preparing ionomeric terpolymers include, but are not limited to, butyl acrylate, ethyl acrylate, methyl acrylate methyl methacrylate, 2-ethylhexyl acrylate and the like. In some embodiments, the ionomer comprises one or more α-olefins alternatively from about 5 to about 40, alternatively from about 8 to about 15, % by weight of ethylenically unsaturated mono- or dicarboxylic acid, the basic copolymer neutralized with metal ions to the extent desired. In these embodiments, at least about 20, alternatively from about 30 to about 90, % of the carboxylic acid groups of the ionomer are neutralized by the metal ions, such as sodium, potassium, zinc, calcium, magnesium, and the like, and exist in the ionic state. In one embodiment, the ionomer is further defined as a poly (ethylene-co-methacrylic acid) ionomer zinc complex, i.e., is neutralized by zinc.

In one embodiment, the ionomer is an at least partially neutralized salt of a copolymer of ethylene and an α, β-unsaturated monocarboxylic acid. In one such embodiment, the ionomer is an at least partially neutralized zinc salt of a copolymer derived from ethylene and methacrylic acid. In this embodiment, the ionomer can be further defined as a poly (ethylene-co-methacrylic acid) ionomer.

In some embodiments, the ionomer is present in the polyamide composition in an amount of from about 5 to about 55, alternatively about 10 to about 45, alternatively about 10 to about 35, alternatively about 10 to about 30, parts by weight per 100 parts by weight of the polyamide composition. Of course, two or more types of ionomers may be included in the polyamide composition. As such, it is to be appreciated that more than one ionomer may be included in the polyamide composition, in which case the total amount of all ionomers present in the polyamide composition is within the above ranges.

In various embodiments, the polyamide composition also comprises a polyolefin, i.e., a polyalkene. In various embodiments, the polyamide composition comprises the polyolefin in lieu of the ionomer, i.e., the polyamide composition comprises the polyolefin and does not include the ionomer. Suitable non-limiting examples of polyolefins include thermoplastic polyolefins such as polyethylene, polypropylene, polymethylpentene, polybutene-1, and combinations thereof. Suitable non-limiting examples of polyolefins also include polyolefin elastomers such as polyisobutylene, ethylene propylene rubber, ethylene propylene diene monomer rubber, and poly vinyl chloride. In various embodiments, the polyolefin is selected from polyethylene, polypropylene, polymethylpentene, polybutene-1, and combinations thereof.

In various embodiments, the polyolefin is anhydride-functional, e.g. comprises maleic anhydride grafted thereon. Maleic anhydride functional polyolefins are preferred because of the high reactivity of the maleic anhydride group with the amino group of the polyamide.

In many embodiments, the polyolefin is crystalline. In some embodiments, the polyolefin can have a crystallinity of from about 0.1 to about 90, alternatively from about 0.1 to about 70, alternatively from about 0.1 to about 50, alternatively from about 0.1 to about 40, alternatively from about 1 to about 30, alternatively from about 5 to about 25, alternatively from about 5 to about 20, alternatively from about 5 to about 15, %. In some embodiments, the polyolefin is a "nano-crystal" polyolefin. That is, in some embodiments the polyolefin comprises nano sized, crystalline particles having a diameter of less than about 900, alternatively less than about 700, alternatively less than about 500, alternatively from about 10 to about 500, alternatively from about 10 to about 200, alternatively from about 20 to about 80, nm. In contrast, thermoplastic and elastomeric polyolefins not considered "nano-crystal" have a crystal size of 1000 nm or greater.

In one embodiment, the polyolefin is nano-crystal polypropylene having a crystal size of about 50 nm. In this embodiment, the nano-crystal polypropylene has a tensile strength at break of about 19 MPa (or greater than 19 MPa) and an elongation at break of greater than about 100%, alternatively about 100%, alternatively greater than about 1000%, alternatively about 1000%, when tested in accordance with ASTM D38. The nano-crystal polypropylene of this embodiment has a melting point of 160° C. and becomes brittle at −28° C.

In some embodiments, the polyolefin is present in the polyamide composition in an amount of from about 5 to about 55, alternatively from about 10 to about 45, alternatively from about 10 to about 35, alternatively from about 10 to about 30, parts by weight per 100 parts by weight of the polyamide composition. Of course, two or more types of polyolefins may be included in the polyamide composition. As such, it is to be appreciated that more than one polyolefin may be included in the polyamide composition, in which case the total amount of all polyolefins present in the polyamide composition is within the above ranges.

The polyamide composition optionally comprises one or more synthetic waxes which can also be referred to as lubricants. The word "wax" as used herein refers to a class of chemical compounds that are plastic (malleable) near ambient temperatures. Waxes typically melt above 45° C. (113° F.) to give a low viscosity liquid. Waxes are also typically insoluble in water but soluble in organic, nonpolar solvents. All waxes are organic compounds, both synthetic and naturally occurring. The synthetic wax is added to the polyamide composition to improve the processability of the polyamide composition and the physical properties of the base layer 12 formed therefrom.

There are various types of synthetic waxes, such as polyethylene waxes (based on polyethylene), Fischer-Tropsch waxes, chemically modified waxes (usually esterified or saponified), substituted amide waxes, polymerized α-olefins, and metal stearates. As such, the polyamide composition typically comprises a synthetic wax selected from the group of polyethylene waxes, Fischer-Tropsch waxes, chemically modified waxes, substituted amide waxes, polymerized α-olefins, metal stearates, and combinations thereof.

The polyamide composition can comprise a substituted amide wax, such as N, N-ethylene bis-stearamide. Substituted amide waxes are the reaction product of fatty acid amidation and have unique properties, such as a relatively high melting point and amide functionality. When included in the resin composition, N, N-ethylene bis-stearamide improves the physical properties of the base layer 12, such as elongation at break, and functions as an internal-external lubricant during melt processing. In a preferred embodiment, the substituted amide wax comprises N, N-ethylene bis-stearamide and has a melting point of from about 130 to about 150° C. and an acid number of from about 5 to about 10 mg KOH/g when tested in accordance with ASTM D974.

In various embodiments, the composition can comprise a synthetic wax selected from the group of substituted amide waxes, metal stearates, and combinations thereof. In various embodiments, the polyamide composition comprises N, N-ethylene bis-stearamide, sodium stearate, and/or zinc stearate. For example, in one embodiment, the polyamide composition comprises a mixture of N, N-ethylene bis-stearamide and sodium stearate. As another example, in one embodiment, the polyamide composition comprises a mixture of N, N-ethylene bis-stearamide, sodium stearate, and zinc stearate.

In some embodiments, the synthetic wax is present in the polyamide composition in an amount of from about 0.1 to about 10, alternatively from about 0.1 to about 5, alternatively from about 0.1 to about 3, alternatively from about 0.1 to about 2, alternatively from about 0.1 to about 1, parts by weight per 100 parts by weight of the polyamide composition. Further, it is to be appreciated that more than one synthetic wax may be included in the polyamide composition, in which case the total amount of all synthetic waxes present in the polyamide composition is within the above ranges.

Without being bound by theory, it is believed that the synthetic wax compatibilizes the components, i.e., the polyamide, the anhydride-functional copolymer, and the ionomer. As such, the physical properties of the composition and the article, e.g. base layer 12, formed therefrom are significantly improved. Further, it also believed that the incorporation of the synthetic wax into the polyamide composition eliminates the need to use plasticizer in the polyamide composition. Plasticizers tend to leach out over time and can negatively impact physical properties of the composition and the article formed therefrom. In one embodiment, the polyamide composition is substantially free of plasticizer. The terminology "substantially free," as used immediately above, refers to an amount of plasticizer of less than 0.1 parts by weight per 100 parts by weight of the polyamide composition.

The polyamide composition optionally comprises one or more copolymers of polyamide and polyether (of various structure, e.g. random, block, branched, liner, etc.) In various embodiments, the polyether of the copolymer of polyamide and polyether can be polyethylene glycol (PEG) based, polyethylene propylene glycol based, or polytetra methylene glycol (PTMG) based. The flexibility of the copolymer of polyamide and polyether is dependent on the length of polyether block (if the copolymer is a block copolymer) and the type of polyether; PTMG blocks are typically more flexible than PEG and PPG blocks. The copolymer of polyamide and polyether has a plasticizing effect on the base layer 12, namely, the copolymer of polyamide can be used to increase the elongation of base layer 12. For example, in one specific embodiment, the polyamide composition comprises a block copolymer of polyamide and polyether. In this embodiment, the polyamide composition can be substantially free of (less than 0.1 parts by weight per 100 parts by weight of the polyamide composition), or free of, wax. In one embodiment, the polyamide composition comprises the copolymer of polyamide and polyether and is substantially free of (less than 0.1 parts by weight per 100 parts by weight of the polyamide composition), or free of, plasticizer. In this embodiment, the tensile modulus of the base layer 12 can be reduced from about 1066 MPa to about 843 MPa when tested in accordance with ISO 178 and the surface appearance of the base layer 12 improved. Specifically, tensile testing is conducted on ISO 3167 test bars of base layer material having a thickness of 4.03 mm and a width 9.98 mm. Tensile testing is conducted on a RENEW 1123/4612/A-B1 machine in accordance with test method SINGLE-HEAD ISO 527-1,2.

Furthermore, the polyamide composition can also comprise an additive that is not a polyamide, an anhydride-functional copolymer, a poly (ethylene-co-methacrylic acid) ionomer, or a synthetic wax. The additive may include, but is not limited to, oxidative and thermal stabilizers, release agents, flame-retarding agents, oxidation inhibitors, oxidation scavengers, neutralizers, antiblock agents, dyes, pigments and other coloring agents, ultraviolet light absorbers and stabilizers, reinforcing agents, nucleators, plasticizers, hot melt adhesives, and combinations thereof. Suitable oxidative and thermal stabilizers include, but are not limited to, metal halides, such as sodium halides, potassium halides, lithium halides, cuprous halides, as well as corresponding chlorides, bromides, and iodides, respectively, and combinations thereof. Also, hindered phenols, hydroquinones, aromatic amines, and combinations thereof may be included. Of course, as set forth above, the polyamide composition can be substantially free of, or free of, plasticizer. However, if included, exemplary plasticizers include, but are not limited to, lactams such as caprolactam and lauryl lactam, sulfonamides such as ortho- and para-toluenesulfonamide and N-ethyl, N-butylbenzene sulfonamide, N-(2-hydroxypropyl) benzene sulfonamide, polyethylene glycol di-2-ethylhexoate, and combinations thereof, as well as other plasticizers known in the art. If utilized, the additive is typically present in an amount of from about 0.1 to about 15, alternatively from about 0.5 to about 10, alternatively from about 0.5 to about 7.5, parts by weight per 100 parts by weight of the polyamide composition.

In one embodiment, the polyamide composition consists of: (A) the polyamide; (B) the anhydride-functional copolymer; (C) the poly (ethylene-co-methacrylic acid) ionomer; and (D) the synthetic wax. In this embodiment, the ratio of (A+B):C can be from about 1:1 to about 5:1, alternatively from about 2:1 to about 4:1, alternatively from about 3:1 to about 4:1, and the ratio of C:D can be from about 10:1 to about 100:1, alternatively from about 30:1 to about 70:1.

As used herein, "consisting essentially of" is meant to exclude any element or combination of elements, as well as any amount of any element or combination of elements, that would alter the basic and novel characteristics of the polyamide composition. In one embodiment, the polyamide composition consists essentially of the polyamide, the anhydride-functional copolymer, the poly (ethylene-co-methacrylic acid) ionomer, and the synthetic wax. In this embodiment, the polyamide composition is substantially free from other polymers known in the art (including elastomers), fillers known in the art (including reinforcing fillers), and plasticizers known in the art. The terminology "substantially free," as used immediately above, refers to an amount of less than 0.1 parts by weight per 100 parts by weight of the polyamide composition.

In another embodiment, the polyamide composition consists essentially of: (A) the polyamide; (B) the anhydride-functional copolymer; (C) the poly (ethylene-co-methacrylic acid) ionomer; and (D) the synthetic wax. In this embodiment, the ratio of (A+B):C can be from about 1:1 to about 5:1, alternatively from about 2:1 to about 4:1, alternatively from about 3:1 to about 4:1 and the ratio of C:D can be from about 10:1 to about 100:1, alternatively from about 30:1 to about 70:1.

The composite article 10 disclosed herein comprises a base layer 12 which is formed from the polyamide composition described above. The base layer 12 comprises the reaction product of the polyamide and the anhydride-functional copolymer and the poly (ethylene-co-methacrylic acid) ionomer, and, optionally, a synthetic wax. The reaction product of the polyamide and the anhydride-functional copolymer is present in the base layer 12 in an amount of from about 15 to about 99, alternatively from about 30 to about 99, alternatively from about 60 to about 98, alternatively from about 60 to about 90, parts by weight per 100 parts by weight of the base layer 12. Of course, the ionomer, e.g. poly (ethylene-co-methacrylic acid) ionomer is present in the base layer 12 in an amount of from about 5 to about 55, alternatively from about 10 to about 45, alternatively from about 10 to about 35, alternatively from about 10 to about 30, parts by weight per 100 parts by weight of the polyamide composition.

The base layer 12 is relatively low density. That is, in some embodiments, the base layer 12 has a specific gravity of from about 0.8 to about 1.15, alternatively from about 0.9 to about 1.10, alternatively from about 1.0 to about 1.05, $g/cm^3$.

In some embodiments, the base layer 12 has a melt flow rate of from about 0.5 to about 15, alternatively from about 1 to about 10, alternatively from about 1 to about 5, g/10 minutes when tested in accordance with ISO 1133 and has a flexural modulus at a room temperature of from about 350 to about 700, alternatively from about 450 to about 600, alternatively from about 500 to about 550, MPa when tested in accordance with ISO 178. Melt viscosity and flexural modulus impact processability of the base layer 12.

The base layer 12 of the subject disclosure has excellent permeation barrier properties while possessing exceptional flexibility and durability. With specific regard to the barrier properties of the base layer 12, the base layer 12 typically has an oxygen permeation rate of less than about 50, alternatively less than about 15, alternatively less than about 10, alternatively less than about 5, alternatively less than about 4, alternatively less than about 3, alternatively less than about 2, alternatively from about 1 to about 15, alternatively from about 1 to about 10, alternatively from about 1 to about 4, $cc/(100\ in^2 \cdot day)$ when tested at a thickness of about 6 mils in accordance with ASTM D-F3985 on a MOCON Oxtran 2/21 Oxygen Permeability Instrument. With specific regard to the strength and elasticity, the base layer 12 can have a tensile strength at 50% elongation of from about 5 to about 50, alternatively from about 8 to about 40, alternatively from about 10 to about 30, MPa when tested in accordance with ISO 527. The base layer 12 can have an elongation at break of greater than about 200, alternatively from about 300 to about 700, alternatively from about 350 to about 600, alternatively from about 350 to about 450, % when tested in accordance with ISO 527.

In various embodiments, as part of the composite article 10, the base layer 12 can comprise one or more layers. The one or more layers can be different, so long as at least one layer of the base layer 12 is formed from the polyamide composition described above.

The instant disclosure provides a composite article 10 including the base layer 12 and an adhesive layer 14 disposed thereon. The adhesive layer 14 is disposed on the base layer 12 for improving the adhesion of the composite article 10 to polymers such as rubber. By "disposed on," it is meant that the adhesive layer 14 is in contact with at least a portion of the base layer 12. The adhesive layer 14 comprises a cationic polymer and an adhesive.

The cationic polymer can be of any type of cationic polymer understood in the art. The cationic polymer can be formed from various monomers understood in the art, such as the monomers described below. The cationic polymer can be in various forms, such as in a dispersion form, an emulsion form, or a resin form (e.g. a solvent-free form). In certain embodiments, the cationic polymer is dispersed in water, is a solution comprising the cationic polymer and a solvent different than water, or is free of water/solvent. Adjusting the form of the cationic polymer can be useful for application purposes.

In one embodiment, the cationic polymer is a polyethyleneimine (PEI). The PEI can be made by various methods understood in the art. For example, the PEI can be made by ring opening polymerization of ethyleneimine. In certain embodiments, the PEI can be further modified, such as by amidation with fatty acids, by alkoxylation with alkylene oxides, or by carboxylation with acrylic acid and/or maleic acid.

In certain embodiments, the PEI has a weight average molecular weight ($M_w$) of from about 800 to about 2,100,000, alternatively from about 1,000 to about 20,000, alternatively from about 1,000 to about 4,000, alternatively from about 2,000 to about 4,000, alternatively from about 10,000 to about 1,000,000, alternatively from about 100,000 to about 1,000,000, alternatively from about 500,000 to about 1,000,000, alternatively from about 700,000 to about 800,000, g/mol. The PEI is typically water soluble. As such, in certain embodiments, the PEI is included in a dispersion or emulsion which comprises from about 2 to about 99, alternatively from about 4 to about 20, parts by weight PEI, remainder water. In other embodiments, the PEI is a resin.

In certain embodiments, the PEI has a pH of from about 11 to about 12. The PEI can have a high charge density, such as from about 8 to about 16 meq/g TS.

In a preferred embodiment the cationic polymer comprises PEI having a $M_w$ of from about 700,000 to about 800,000, a pH of from about 10 to about 12, a pour point of from about 0 to about −5° C. and a specific gravity of about 1 to about 1.3 $g/cm^3$. In this embodiment the cationic polymer comprises about 50% solids and can be diluted, e.g. diluted to 5% solids, prior to application to the base layer 12.

In another embodiment, the cationic polymer is a polyvinylamine (PVAm). In certain embodiments, the PVAm has a $M_w$ of about 340,000, a density of about 1.08 g/ml, a pH of from about 7 to about 9, and a viscosity of about 5,000 mPas or greater at 20° C.

In another embodiment, the cationic polymer is a polyvinylformamide (PVFA). The PVFA can be made by various methods understood in the art. For example, the PVFA can be made by radical polymerization of vinylformamide (VFA) using Azo compounds as initiators. The polymerization can also be carried out by cationic polymerization with protonoic acids such as methylsulfonic acid or Lewis acids, such as boron trifluoride. The PVFA can also be hydrolyzed to yield the PVAm. The cationic polymer may be produced as a homopolymer or as a copolymer. The copolymerization involves the VFA and other monomers such as acrylamide, acrylic acid, acrylonitrile, ethylene, sodium acrylate, maleic anhydride, methylacrylate, vinylacetate, N-vinypyrolidone, or combinations thereof.

In certain embodiments, the PVAm or PVFA has a $M_w$ of from about 8,000 to about 3,010,000. In certain embodiments, the PVAm or PVFA is included in a dispersion or emulsion which comprises from about 5 to about 40 parts by weight PVAm or PVFA, remainder water. In other embodiments, the tackifier component is PVAm or PVFA resin. The PVAm or PVFA can have a high charge density, such as from about 5 to about 16 meq/g.

In yet another embodiment, the cationic polymer is a polyoxyalkylene amine. The polyoxyalkylene amine can comprise a polyoxyalkylene monoamine, diamine, triamine, or combinations thereof. These compounds are defined by an amino group attached to a terminus of a polyether backbone and, thus, are considered polyether amines. The amino group is a primary amino group. Depending upon whether the polyoxyalkylene amine is a mono-, di-, or triamine, each compound can contain, respectively, one, two, or three amino groups, e.g. primary amino groups, with each group being attached to the terminus of a polyether backbone. Accordingly, one or more polyether backbones may be necessary to accommodate the number of terminal amino groups. Further description of polyoxyalkylene amines and their use is as disclosed in U.S. Pat. No. 7,714,051, fully incorporated herein by reference. Suitable polyoxyalkylene amines include polyoxyalkylene mono-, di-, and triamines.

In certain embodiments, the cationic polymer has a glass transition temperature ($T_g$) of from about −50° C. to about +200° C., alternatively from about +75° C. to about +175° C., alternatively from about +75° C. to about +150° C., alternatively from about +90° C. to about +145° C., alternatively from about +90° C. to about +141° C.

In certain embodiments, the cationic polymer has a $M_w$ of from about 500 to about 3,500,000, alternatively from about 800 to about 3,100,000, alternatively from about 8,000 to about 3,100,000, alternatively from about 8,000 to about 1,500,000, alternatively from about 10,000 to about 500,000, alternatively from about 100,000 to about 1,000,000, alternatively from about 500,000 to about 1,000,000, alternatively from about 700,000 to about 800,000, alternatively from about 10,000 to about 200,000, alternatively from about 10,000 to about 40,000.

The cationic polymer may be reactive with the base layer 12 and/or the resorcinol-formaldehyde-latex (RFL) adhesive. As such, in certain embodiments, the cationic polymer has at least one functional group reactive with the base layer 12 and/or the RFL adhesive. The cationic polymer can comprise various types of functional groups in addition to amine functional groups and amide functional groups, including, but not limited to, carboxylic acid groups, hydroxyl groups, and combinations thereof. Those of skill in the art appreciate that various groups can be imparted, i.e., the cationic polymer can be further modified, depending on the reactants (and types and amounts) and processes used to form the cationic polymer.

Specific examples of suitable cationic polymer dispersions, emulsions, and/or resins are commercially available from BASF Corporation, including the family of products designated under the trademark LUPAMIN®, such as, but not limited to, LUPAMIN® 5095, LUPAMIN® 9095, LUPAMIN® 9050, LUPAMIN® 9030, LUPAMIN® 9010, LUPAMIN® 9000, LUPAMIN® 4595, LUPAMIN® 4500, LUPAMIN® 1500, and LUPAMIN 1595; and the family of products designated as LUPASOL®, such as, but not limited to, LUPASOL® FG, LUPASOL® G10, LUPASOL® G20, LUPASOL® G35, LUPASOL® G100, LUPASOL® LU 321, LUPASOL® PR8515, LUPASOL® PN50, LUPASOL® PN60, LUPASOL® PO 100, LUPASOL® SK, LUPASOL® HF, LUPASOL® WF, LUPASOL® PS, and LUPASOL® P.

In some embodiments, the cationic polymer is present in the composite article 10 in an amount of from about 0.01 to about 0.5, alternatively from about 0.01 to about 0.1, g/m² (on a surface of the base layer 12). Further, it is to be appreciated that more than one cationic polymer may be included in the composite article 10, in which case the total amount of all cationic polymers present in the composite article 10 is within the above ranges. Of course, the ranges above and/or application amounts described below may vary in embodiments where the cationic polymer is included in a dispersion, emulsion, etc., because of the additional water and other solvents included in such embodiments.

As set forth above, the adhesive layer 14 also comprises an adhesive. The adhesive can be any adhesive know in the art. The adhesive can be a hot melt adhesive, a water or solvent based adhesive, and/or a liquid rubber adhesive. Non-limiting examples of suitable adhesives comprise polymers such as ethylene vinyl acetate copolymers, ethylene acrylate copolymers, (meth)acrylates, polyolefins (e.g. polyethylene (HDPE, LDPE, etc.), polypropylene, polybutene-1, oxidized polyethylene, polybutene, amorphous polyolefins (amorphous propylene, amorphous propylene/ethylene, amorphous propylene/butene, amorphous propylene/hexene, amorphous propylene/ethylene/butene, etc.), chlorinated polyolefins (chlorinated polypropylene), maleic anhydride modified polyolefins), polyamides and polyesters, polyesters, polyurethanes (TPU, PUR, etc.), styrene block copolymers (styrene-butadiene-styrene, styrene-isoprene-styrene, styrene-ethylene/butylene-styrene, styrene-ethylene/propylene), polycaprolactone, polycarbonates, fluoropolymers, silicones, thermoplastic elastomers, rubbers (natural rubber, polybutadiene, styrene butadiene rubber, butyl rubber, EPDM rubber), polypyrrole, resorcinol formaldehyde, other polymers and copolymers, and combinations thereof.

In some embodiments, the adhesive is a resorcinol-formaldehyde-latex (RFL) adhesive. The RFL adhesive is typically applied to the base layer 12 in the form of an emulsion comprising a resorcinol-formaldehyde resin, and one or more elastomer latexes. The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are typically included in the RFL adhesive/adhesive layer 14 to facilitate rubber adhesion of further layers/components.

In some embodiments, the RFL adhesive comprises a resorcinol formaldehyde resin, a styrene-butadiene copolymer latex, a vinylpyridine-styrene-butadiene terpolymer latex, and a blocked isocyanate. In other embodiments, the RFL adhesive comprises a resorcinol, formaldehyde, a styrene-butadiene rubber latex, a vinylpyridine-styrene-butadiene terpolymer latex, and a blocked isocyanate.

In one embodiment, the resorcinol is dissolved in water to which about 37 parts by weight formaldehyde has been added together with a strong base such as sodium hydroxide. The strong base should generally constitute about 7.5 parts by weight or less of the resorcinol, and the molar ratio of the formaldehyde to resorcinol should be in a range of from about 1 to about 2, alternatively from about 1.5 to about 2. The aqueous solution of the resole or condensation product or resin can be mixed with the styrene-butadiene latex and vinylpyridine-styrene-butadiene terpolymer latex. In some embodiments, the RFL adhesive comprises the resole or other mentioned condensation product or materials that form the condensation product in an amount of from about 5 to about 40, alternatively from about 10 to about 28, parts by weight, per 100 parts by weight solids in the RFL adhesive. The condensation product forming the resole or resole type resin forming materials can be partially reacted or reacted so as to be only partially soluble in water. Sufficient water can be added to the RFL adhesive to form the RFL adhesive that comprises solids in an amount of from about 12 to about 28 parts by weight, per 100 parts by weight of the RFL adhesive. The weight ratio of the polymeric solids from the latex to the resorcinol/formaldehyde resin should be in a range of about 2:1 to about 6:1.

As set forth above, the RFL adhesive may include a blocked isocyanate. In one embodiment, the blocked isocyanate is included in the RFL adhesive in an amount of from about 1 to about 8 parts by weight, per 100 parts by weight solids in the RFL adhesive. The blocked isocyanate may be any suitable blocked isocyanate known to be used in RFL adhesives including, but not limited to, caprolactam blocked methylene-bis-(4-phenylisocyanate), such as GRILBOND-IL6 available from EMS American Grilon, Inc., and phenol formaldehyde blocked isocyanates as disclosed in U.S. Pat. Nos. 3,226,276; 3,268,467; and 3,298,984; the three of which are fully incorporated herein by reference. As a blocked isocyanate, use may be made of reaction products between one or more isocyanates and one or more kinds of isocyanate blocking agents. The isocyanates include monoisocyanates, such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocyante, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4diisocyanate, diphenyl ethane diisocyanate, 1,5-naphthalene diisocyanate, etc., and triisocyanates, such as triphenylmethane triisocyanate, diphenylmethane triisocyanate, etc. The isocyanate-blocking agents include phenols, such as phenol, cresol, and resorcinol, tertiary alcohols, such as t-butanol and t-pentanol, aromatic amines, such as diphenylamine, diphenylnaphthylamine and xylidine, ethyleneimines, such as ethylene imine and propyleneimine, imides, such as succinic acid imide, and phthalimide, lactams, such as ε-caprolactam, δ-valerolactam, and butyrolactam, ureas, such as urea and diethylene urea, oximes such as acetoxime, cyclohexanoxime, benzophenon oxime, and α-pyrolidon.

Of course, the polymers may be added to the RFL adhesive in the form of a latex or otherwise. In one embodiment, a vinylpyridine-styrene-butadiene terpolymer latex and styrene-butadiene rubber latex is to be added to the RFL adhesive. In one embodiment, the vinylpyridine-styrene-butadiene terpolymer is included in the RFL adhesive in an amount of from about 100 to about 25 parts by weight, per 100 parts by weight of the styrene-butadiene rubber in the RFL adhesive. In other words, the weight ratio of vinylpyridine-styrene-butadiene terpolymer to styrene-butadiene rubber is from about 1:0 (100% vinylpyridine-styrene-butadiene terpolymer with no styrene-butadiene rubber) to about 1:1, alternatively from about 1:0 to about 1:1.5, alternatively from about 1:0 to about 1:2, alternatively from about 1:0 to about 1:3, alternatively from about 2:1 to about 1:1.5, alternatively from about 2:1 to about 1:1.

The composite article 10 comprises the base layer 12 and the adhesive layer 14 disposed thereon. The composite article 10 of the subject invention can include more layers than the base layer 12 and the adhesive layer 14. Said differently, the composite article 10 can include additional layers. The additional layers can be between the base layer 12 and the adhesive layer 14, or the base layer 12 and adhesive layer 14 can be adjacent to one another, and the additional layers can be disposed on the surfaces of the adjacent layers.

As one example, the composite article 10 can include a first base layer 12, a first adhesive layer 14 disposed on the first base layer 12, a second base layer 12 disposed on the first adhesive layer 14, and a second adhesive layer 14 disposed on the second base layer 12, i.e., 4 layers. Such an embodiment could provide greater impermeability and durability and could be used in various applications such as in tires, rafts, and food packaging. As another example, the composite article 10 can include a base layer 12 having a first adhesive layer 14 disposed on a first surface of the base layer 12, and a second adhesive layer 14 disposed on an opposite facing surface of the base layer 12. Such configurations can be part of a larger whole, e.g. integrated into a product such as a tire, a raft, or food packaging.

Figure 2:
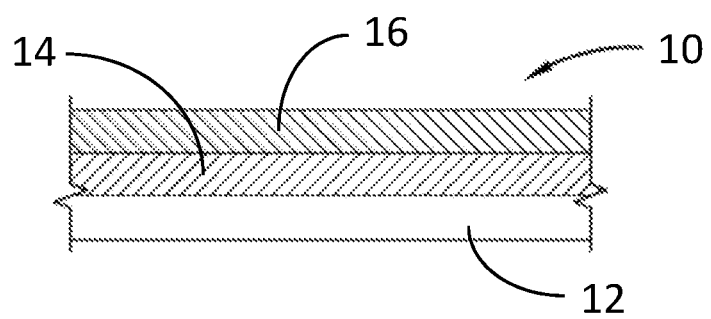
FIG. 2 is an enlarged cross-sectional view of the composite article of FIG. 1 having a natural rubber latex layer disposed thereon.

As another example, the composite article 10 can comprise the base layer 12, and adhesive layer 14 disposed on the base layer 12, and a natural rubber latex layer 16 disposed on the adhesive layer 14, as is shown in FIG. 2 and described below.

In some embodiments, the adhesive is present in the composite article 10 in an amount of from about 0.01 to about 5, alternatively from about 0.01 to about 2, alternatively from about 0.1 to about 2, alternatively from about 0.01 to about 1, alternatively from about 0.1 to about 1, alternatively from about 0.01 to about 0.5, parts by weight per 100 parts by weight of the base layer 12. Further, it is to be appreciated that more than one RFL adhesive may be included in the composite article 10, in which case the total amount of all RFL adhesives present in the composite article 10 is within the above ranges. Of course, the ranges above and/or application amounts described below may vary in embodiments where the adhesive is included in a dispersion, emulsion, etc., because of the additional water and other solvents included in such embodiments.

In some embodiments, the adhesive layer 14, which comprises both the cationic polymer and the adhesive, is present in the composite article 10 in an amount of from about 0.1 to about 5, alternatively from about 0.1 to about 1, parts by weight, and the base layer 12 is present in an amount of from about 95 to about 99.9, alternatively from about 99 to about 99.9, parts by weight, per 100 parts by weight of said composite article 10.

In view of the above, an adhesive comprising a cationic polymer and a resorcinol-formaldehyde-latex (RFL) adhesive for adhering a polyamide to an elastomer is also disclosed herein. The adhesive, as described above, can comprise the cationic polymer selected from the group of a polyethyleneimine, a polyvinylamine, a polyvinylformamide, and combinations thereof and the RFL adhesive, for example, comprising a resorcinol-formaldehyde resin, a styrene-butadiene rubber, and a vinylpyridine-styrene-butadiene rubber.

In some embodiments, the composite article 10 comprises the base layer 12, the adhesive layer 14, and the natural rubber latex layer 16. FIG. 2 is a cross-sectional view of the composite article 10 having a natural rubber latex layer 16 disposed thereon.

In one such preferred embodiment, the composite article 10 comprises the base layer 12, the adhesive layer 14 disposed on the base layer 12, and the natural rubber latex layer 16 disposed on the adhesive layer 14. The natural rubber latex layer 16 is formed from a natural rubber latex.

The natural rubber latex comprises natural rubber (i.e., polyisoprene and other polymers formed from isoprene), various organic compounds, and water. As is known in the art, natural rubber latex is a sticky, milky colloid harvested from rubber trees. The phrase "natural rubber latex" as used herein includes natural rubber and/or derivatives thereof. Non-limiting examples of derivatives of natural rubber include natural rubber having methyl methacrylate grafted thereon, natural rubber having epoxy grafted thereon (ENR), natural rubber having fluorinated phenyl azides grafted thereon, natural rubber having styrene and/or butadiene grafted thereon, natural rubber which is further cross-linked, liquid natural rubber (LNR) which is formed via the degradation of high molecular weight natural rubber, etc.

The natural rubber latex of the subject invention can include one or more different polymers. For example, the natural rubber latex of the subject invention can include natural rubber and natural rubber having methyl methacrylate grafted thereon (NR-PMMA). As another example, the natural rubber latex can include natural rubber having methyl methacrylate grafted thereon and natural rubber having epoxy grafted thereon. As yet another example, the natural rubber latex can include natural rubber, natural rubber having methyl methacrylate grafted thereon, and natural rubber having epoxy grafted thereon. As still yet another example, the natural rubber latex can include natural rubber and a synthetic polymer (e.g. styrene butadiene rubber, ethylene propylene diene monomer rubber, etc.)

In various preferred embodiments, the natural rubber latex comprises a graft polymer which is produced by grafting methyl methacrylate onto natural rubber. The graft polymer comprising natural rubber having methyl methacrylate grafted thereon exhibits both elastomeric and plastic properties because of its chemical structure. Further, the graft polymer of these embodiments provides adhesion between dissimilar materials such as natural and synthetic rubber, leather, polymers (e.g. polyamide and polyvinyl chloride), textiles, and metals. In various embodiments, the natural rubber having methyl methacrylate grafted thereon can have a natural rubber to methyl methacrylate weight ratio of from about 20:1 to 1:5, alternatively from about 5:1 to 1:5, alternatively from about 5:1 to about 2:1. Further, in such embodiments, the natural rubber latex can have a total solids of from about 25 to about 75, alternatively from about 35 to about 65, and/or a pH of greater than about 7, alternatively greater than about 10.

In various other embodiments, the natural rubber latex comprises a graft polymer which is produced by grafting epoxy onto natural rubber (e.g. epoxidized natural rubber). In such embodiments, the epoxidized natural rubber can have a natural rubber to epoxy weight ratio of from about 20:1 to 1:2, alternatively from about 10:1 to 1:2, alternatively from about 5:1 to about 1:1, alternatively from about 5:1 to about 2:1. Further, in such embodiments, the natural rubber latex can have a total solids of from about 5 to about 75, alternatively from about 15 to about 65, alternatively from about 35 to about 65. The graft polymer of these embodiments also provides adhesion between dissimilar materials such as natural and synthetic rubber, leather, polymers (e.g. polyamide and polyvinyl chloride), textiles, and metals.

In some embodiments, the natural rubber latex layer 16 is present in the composite article 10 in an amount of from about 0.01 to about 5, alternatively from about 0.01 to about 2, alternatively from about 0.1 to about 2, alternatively from about 0.01 to about 1, alternatively from about 0.1 to about 1, alternatively from about 0.01 to about 0.5, parts by weight per 100 parts by weight of the base layer 12. Further, it is to be appreciated that more than one natural rubber latex may be included in the natural rubber latex layer 16, in which case the total amount of all natural rubber latex present in the natural rubber latex layer 16 is within the above ranges. Of course, the ranges above and/or application amounts described below may vary in embodiments where the natural rubber latex is included in a dispersion, emulsion, etc., because of the additional water and other solvents included in such embodiments.

The subject disclosure also comprises a method of forming the composite article 10 comprising the base layer 12 and the adhesive layer 14 disposed thereon. The method comprises the steps of mixing, e.g. compounding, the polyamide composition comprising a polyamide, an anhydride-functional copolymer, and an ionomer to form the base layer 12 comprising the reaction product of the polyamide and the anhydride-functional copolymer and the ionomer, and applying the cationic polymer and the adhesive to the base layer 12 to form the adhesive layer 14 thereon. The components of the method, e.g. the polyamide composition, the polyamide, the anhydride-functional copolymer, the ionomer, the base layer 12, the cationic polymer, the adhesive, etc., are just as described above.

In the step of compounding the polyamide composition to form the base layer 12, the polyamide composition comprising the polyamide, the anhydride-functional copolymer, the ionomer, and optionally the copolymer or synthetic wax are combined. The step of compounding may occur through any method known in the art including, but not limited to, direct extrusion, belt extrusion, reaction extrusion, reaction injection molding, vertical mixing, horizontal mixing, feed mixing, and combinations thereof. In one embodiment, the step of compounding is further defined as combining the polyamide, the anhydride-functional copolymer, the poly(ethylene-co-methacrylic acid) ionomer, and, optionally, the synthetic wax in a twin-screw extruder. In one embodiment, the polyamide composition is compounded via twin-screw extrusion and subsequently formed via cast or blown film extrusion. Compounding the polyamide composition may cause all or some of the polyamide to react with the anhydride-functional copolymer.

During the cast film extrusion process of various embodiments, the polyamide composition is fed through a slot die of a given thickness and is quenched on a chill roller upon exiting the die to form a polyamide composition film. The polyamide composition film may pass over multiple chill rollers before being wound onto a spool.

During the blown film extrusion process of various embodiments, blown film is formed via blowing the polyamide composition (in a molten state) vertically upwards and outwards into a bubble. The bubble is then transformed into rolls while it is cooled by the surrounding air. Some embodiments of the blown film extrusion process comprise any combination of the following process parameters: an annular die having a die temperature of from about 215 to about 275, alternatively from about 235 to about 255, ° C.; a blow up ratio of from about 0.9 to about 1.4, alternatively from about 1.08 to about 1.22; and a cooling temperature of from about 0 to about 20, alternatively from about 5 to about 15, ° C.

Without being bound by theory, it is believed that blown film formed with the polyamide composition has a composite (multi-dimensional) orientation of molecular structure and that cast film formed with the polyamide composition has a singular (linear) orientation of molecular structure. As such, blown film is tougher and has less of a chance to puncture than cast film. Said differently, a base layer 12 comprising blown film formed with the polyamide composition has less orientation than a base layer 12 comprising a cast film formed with the polyamide composition and, therefore, the base layer 12 comprising blown film formed with the polyamide composition has exceptional durability, toughness, and puncture resistance.

The method can optionally comprise the step of heating the polyamide composition during the step of compounding. That is, the polyamide composition including the polyamide, the anhydride-functional copolymer, the poly (ethylene-co-methacrylic acid) ionomer, and the synthetic wax can be heated while in the compounding device, outside of the compounding device, or both outside of the compounding device and in the compounding device.

The method may also comprise the step of pelletizing, dicing, or granulating, the compounded polyamide composition. For example, the compounded polyamide composition may be pelletized with an underwater pelletizer or a strand pelletizer.

Once compounded, the base layer 12 is formed. Typically, the compounded polyamide composition, usually in the form of pellets, is extruded into film or thin sheets to form the base layer 12. However, the method is not limited to extrusion processes. For example, the base layer 12 can be injection molded.

In some embodiments, the base layer 12 has a thickness of from about 1 to about 200, alternatively from about 1 to about 100, alternatively from about 1 to about 50, alternatively from about 1 to about 10, alternatively from about 1 to about 6, alternatively from about 1 to about 4, mils.

Once the base layer 12 is formed, the method can comprise the step of corona treating the adhesive layer 14. That is, the base layer 12 can be exposed to a corona discharge, using techniques as are known in the art, for example as disclosed in U.S. Pat. No. 5,466,424. Corona discharge typically involves an electrical discharge that causes oxygen or other gas molecules within the discharge area to break into their atomic form, leaving them free to bond onto molecules on the surface of the treated article. Said differently, the step of corona treating increases the surface energy of a surface of the base layer 12.

In various embodiments, the step of corona treating is further defined as increasing the surface energy of the untreated base layer 12 by an amount of greater than about 10, alternatively greater than 20, alternatively greater than 30, alternatively greater than 40, alternatively greater than 48, dynes. The step of corona treating can be conducted in the machine direction or against the machine direction of the base layer 12 if the base layer 12 is formed via extrusion.

The method also comprises the step of applying the cationic polymer and the adhesive to the base layer 12 to form the adhesive layer 14 thereon. In one embodiment of the method, the cationic polymer is first applied to an outer surface of the base layer 12 and the adhesive is subsequently applied to the base layer 12. In another embodiment of the method, an adhesive composition comprising the cationic polymer and the adhesive is applied to the base layer 12 in a single step. The cationic polymer and the adhesive can be applied to any exterior surface of the base layer 12 to form the adhesive layer 14 thereon. For example, cationic polymer and the adhesive (together or separate) can be applied to the base layer 12 via Meyer rod, gravure roll, dip coating, spray coating, or by other methods known in the art.

In some embodiments, the cationic polymer may be applied to the film from a water dispersion containing about 0.5% solids. In such embodiments, the dry coat weight of cationic polymer is about 0.04 g/m$^2$ based on the area of the base layer 12 and the thickness is in the Angstrom range.

With respect to the adhesive layer 14, in some embodiments, the cationic polymer is applied to the base layer 12 and is present in the composite article 10 in an amount of from about 0.01 to about 0.5, alternatively about 0.01 to about 0.1, g/m$^2$ (on the surface of the base layer 12) and the adhesive is present in the composite article 10 in an amount of from about 0.1 to about 500, alternatively about 0.1 to about 100, alternatively about 0.1 to about 10, alternatively about 0.01 to about 5, g/m$^2$ of surface area of the base layer 12.

With respect to the adhesive layer 14, in some embodiments, the adhesive layer 14 is applied to the base layer 12 in an amount of from about 0.1 to about 10, alternatively about 0.1 to about 5, alternatively about 0.1 to about 2, alternatively about 0.5 to about 1.5, mils. To this end, in some embodiments, the adhesive layer 14 (including both the cationic polymer and the adhesive) has a thickness of from about 0.1 to about 10, alternatively about 0.1 to about 5, alternatively about 0.1 to about 2, alternatively about 0.5 to about 1.5, mils.

The method can also comprise the step of applying the natural rubber latex to the adhesive layer 14 to form the natural rubber latex layer 16. The natural rubber latex can be applied to the adhesive layer 14 via Meyer rod, gravure roll, dip coating, spray coating, or by other methods known in the art. In some embodiments, the natural rubber latex is applied to form a natural rubber latex layer 16 having a thickness of from about 0.1 to about 10, alternatively about 0.1 to about 5, alternatively about 0.1 to about 2, alternatively about 0.5 to about 1.5, mils.

In various embodiments, the composite article 10 comprises the adhesive layer 14 and the natural rubber latex layer 16 in a thickness ratio of from about 4:1 to about 20:1, alternatively from about 8:1 to about 15:1. Sometimes, when too much NR latex is used in the composite article 10, in too thick of a natural rubber latex layer 16 (e.g. greater than about 5 microns), the layers of the composite article 10 do not demonstrate sufficient dynamic bonding strength during in-plane shear deformation cycle. In one embodiment, the solid content of NR latex is reduced to about 5% solids which results in a natural rubber latex layer 16 having reduced thickness of about 1.5 microns. In this embodiment, the dynamic bonding strength of the composite article 10 is significantly improved. Said differently, when the thickness of the adhesive layer 14 and the natural rubber latex layer 16 vary outside of the ratios set forth above, adhesive failure between the layers of the composite article 10 can occur (e.g. interface debonding between a top layer/sheet and the adhesive layer 14).

In one embodiment, the composite article 10 is incorporated into a tire build for use as an inner liner in a pneumatic tire. Incorporation of the composite article 10 may be accomplished using methods as are known in the art. In one embodiment, the composite article 10 may be applied to a rubber plycoat of a tire carcass ply, with the natural rubber latex layer 16 and the adhesive layer 14 of the composite article 10 (inner liner in this embodiment) in direct contact with a rubber plycoat. In such an embodiment, the base layer 12 of the composite article 10 is the radially innermost layer of the pneumatic tire which is designed to inhibit the passage or permeation of air and oxygen through the composite article 10 (in this case inner liner) to promote air retention within a pneumatic tire cavity.

The pneumatic tire may be a race tire, passenger tire, aircraft tire, agricultural, earthmover, off-the-road, truck tire, and the like. In one embodiment, the tire is a passenger or truck tire. The tire may also be a radial or bias.

The following examples are intended to illustrate the instant disclosure and are not to be viewed in any way as limiting to the scope of the instant disclosure.

EXAMPLES

Polyamide Compositions 1-5 are according to the subject disclosure. The formulas of the Polyamide Compositions 1-5 are set forth in Table 1 below. The Polyamide Compositions, including a polyamide, an anhydride-functional copolymer reactive with the polyamide, an ionomer, and the other components, e.g. copolymers, synthetic wax, etc., are compounded with a twin screw extruder. Immediately following compounding/extrusion, the Polyamide Compositions are pelletized. Once pelletized, the Polyamide Compositions are dried and extruded into test sheets using a single screw extrusion cast film line and corona treated at a voltage of 0.09 kV and a line speed of 15 min/sec (residence time is <1 second). The polyamide and the anhydride-functional copolymer react during compounding and the subsequent extrusion and heating processes to form an article.

Referring now to Table 1, the amount and type of each component included in Polyamide Compositions 1-5 is indicated with all values in parts by weight based on 100 parts by weight of each Polyamide Composition.

TABLE 1

| | Composition 1 | Composition 2 | Composition 3 | Composition 4 | Composition 5 |
|---|---|---|---|---|---|
| Polyamide | 58.50 | 49.5 | 49.5 | 49.5 | 49.5 |
| Anhydride-Functional Copolymer 1 | 20.00 | 20 | 10 | 10 | — |
| Anhydride-Functional Copolymer 2 | — | — | — | — | 10 |
| Anhydride-Functional Copolymer 3 | — | — | — | — | 10 |
| Ionomer | 20.00 | 20 | 30 | 30 | — |
| Nano-crystal Polypropylene | — | — | — | — | 10 |
| Copolymer 1 | — | — | 10 | — | — |
| Copolymer 2 | — | 10 | — | 10 | — |
| Copolymer 3 | — | — | — | — | — |
| Synthetic Wax 1 | 0.50 | — | — | — | — |
| Synthetic Wax 2 | 0.50 | — | — | — | 0.5 |
| Synthetic Wax 3 | — | — | — | — | 0.5 |
| Additive 1 | 0.50 | 0.25 | 0.25 | 0.25 | 0.5 |

Polyamide is polyamide 6/66.

Anhydride-functional copolymer 1 is a maleic anhydride modified ethylene-octene copolymer.

Anhydride-functional copolymer 2 is a maleic anhydride modified ethylene-butene copolymer.

Anhydride-functional copolymer 3 is a compatibilizer blend comprising a maleic anhydride modified ethylene-butene copolymer.

Ionomer is a zinc ionomer of ethylene methyacrylic acid copolymer (poly(ethylene-co-methacrylic acid)).

Copolymer 1 is a block copolymer of polyamide 6 and polyether having a melting point of 160° C. when tested in accordance with ISO 11357 and a flexural modulus of about 77 MPa when tested in accordance with ISO 178.

Copolymer 2 is a block copolymer of polyamide 12 and polyether having a melting point of 204° C. when tested in accordance with ISO 11357 and a flexural modulus of about 80 MPa when tested in accordance with ISO 178.

Synthetic Wax 1 is N, N-ethylene bis-stearamide.

Synthetic Wax 2 is sodium stearate.

Synthetic Wax 3 is zinc stearate.

Additive 1 is a thermal stabilizer.

The Polyamide Compositions 1-5 are compounded on a twin-screw, co-rotating extruder to form Base Layers 1-5. As is well known in the art, compounding is a technique to prepare polymeric materials such as that of the base layer. Here, the twin-screw extruder is used to form strands of the base layer. The twin-screw extruder includes two screws that rotate clockwise at a certain speed (RPM) in a metal barrel to move a mixture of components including the polyamide, the anhydride-functional copolymer, the poly (ethylene-co-methacrylic acid) ionomer, and the copolymer and/or synthetic wax. The barrel and screws provides bearing surfaces where shear is imparted to the mixture. Different screw geometries can be used to create the desired amount of shear mixing. Heating media are housed around the barrel and establish temperature zones in the barrel that are varied according to processing conditions known to those of skill in the art; the specific compounding conditions for this example are set forth in Table 2 below. For this example, the individual components of each Polyamide Composition are added to the twin-screw extruder in a first zone (Zone 1) and passed through a series of nine additional zones (Zones 2-10) that are heated to varying temperatures. A vacuum of about 100 mbar is drawn in Zone 8 to remove unwanted volatiles. Then, each compounded Polyamide Composition (Base Layer) is pushed through a strand die to form the strands which are cooled with water and pelletized.

TABLE 2

| Compounding Parameters | |
| --- | --- |
| Zone 1 Temperature (° C.) | 230 |
| Zone 2 Temperature (° C.) | 230 |
| Zone 3 Temperature (° C.) | 240 |
| Zone 4 Temperature (° C.) | 240 |
| Zone 5 Temperature (° C.) | 250 |
| Zone 6 Temperature (° C.) | 250 |
| Zone 7 Temperature (° C.) | 250 |
| Zone 8 Temperature (° C.) | 260 |
| Zone 9 Temperature (° C.) | 260 |
| Zone 10 Temperature (° C.) | 260 |
| Die Temperature (° C.) | 260 |
| Screw Speed (RPM) | 400 |
| Torque (Amps) | 70 |
| Production Rate (lb./hr.) | 180 |
| Melt Temperature (° C.) | 275 |
| Melt Pressure (PSI) | 150 |

Base Layers 1-5, now pelletized, are subsequently extruded into test sheets on a single screw extruder with cast film die. The test sheets are approximately 0.1 to 0.8 mm thick.

TABLE 3

| Extrusion Parameters | |
| --- | --- |
| Zone 1 Temperature (° C.) | 270 |
| Zone 2 Temperature (° C.) | 260 |
| Zone 3 Temperature (° C.) | 255 |
| Die Temperature (° C.) | 270 |
| Screw Speed (RPM) | 60 |
| Torque (Amps) | 4 |
| Production Rate (ft./min.) | 8 |
| Melt Temperature (° C.) | 275 |
| Melt Pressure (PSI) | 3200 |

Once extruded, the test sheets of Base Layers 1-4 are tested for Oxygen Permeation Rate. The test results are set forth in Table 4 below.

TABLE 4

| Composition ID | Base Layer ID | Thickness (mils) | $O_2$ Transmission Rate ($cc/(100\ in^2 \cdot day)$) |
| --- | --- | --- | --- |
| Composition 1 | Base Layer 1 | 6 | 2.72 |
| Composition 2 | Base Layer 2 | 6 | 4.04 |
| Composition 3 | Base Layer 3 | 9 | 3.11 |
| Composition 4 | Base Layer 4 | 7 | 1.72 |

As the results in Table 4 demonstrate, Base Layers 1-4, which are formed in accordance with the subject invention, exhibit excellent $O_2$ transmission resistance.

Once formed, Base Layer 1 is also analyzed to determine Permeation Rate, Tensile Strength at 50% elongation at 23° C., Elongation at Break at 23° C., Izod Impact Strength at 23° C. and −40° C., and melting point. The test methods and the results are set forth in Table 5 below.

TABLE 5

| | Example 1 |
| --- | --- |
| Permeation Rate ($cm^3 \cdot mm/(m^2 \cdot day)$) ASTM F3985 | 5.6 |
| Tensile Strength, 50% Elongation, at 23° C. (psi) ASTM D638 | 26 |
| Elongation at Break, at 23° C. (%) ASTM D638 | 501 |
| Izod, 23° C. (kJ/m2) ISO 179 | 112 |
| Izod, −40° C. (kJ/m2) ISO 179 | 138 |
| $T_m$ (° C.) | 198 |

As the results in Table 5 demonstrate, Base Layer 1, which is formed in accordance with the subject invention, exhibits excellent physical properties over a wide range of temperatures. In view of these test results, the composite articles formed can be utilized in various applications which require low permeability, flexibility, and durability over a range of temperatures.

Once Polyamide Composition 1 is compounded and extruded into test sheets of Base Layer 1, the adhesive layer is applied to the test sheets to form the composite articles of Examples 1-14. First, a 5% solids emulsion of polyethyleneimine is diluted with water to 0.5% solids applied using a Meyer rod and is dried for 1 minute at 80° C. to achieve a dry coat weight of 0.04 $g/m^2$. Next, each respective adhesive is applied at a thickness of less than 1 mil. Finally, a layer of rubber compound is applied to the adhesive. Once the composite article comprising a base layer and an adhesive layer is formed and the rubber compound is applied, the composite article having the base layer is cured for 23 minutes at 170° C. The interfacial adhesion between the layers at 100° C. was determined by pulling the base layer away from the rubber compound at a right angle to the untorn test specimen with the two ends being pulled apart at a 180° angle to each other using an Instron machine. An area of contact was determined from placement of a Mylar sheet between the compounds during cure. A window in the Mylar allowed the two materials to come into contact with each other during testing. Testing was conducted in accordance with ASTM D4393, with the exception that a sample width of 2.5 cm is used and a clear Mylar plastic film window of a 5 mm width is inserted between the two test samples. The interfacial adhesion between the composite articles of Examples 1-14 and the layer of rubber compound is set forth in Table 6 below.

TABLE 6

| Example ID | Adhesive | Type | Coating Method | Adhesion Strength (kgf/inch) |
|---|---|---|---|---|
| Example 1 | styrene ethylene butylene styrene block copolymer | hot melt adhesive | extrusion coating | 0.46 |
| Example 2 | styrene ethylene butylene styrene block copolymer and the reaction product of butylphenol and acetylene | hot melt adhesive | extrusion coating | 0.48 |
| Example 3 | butadiene olefin compound | hot melt adhesive | extrusion coating | 2.03 |
| Example 4 | styrene isoprene styrene block copolymer | hot melt adhesive | extrusion coating | 2.54 |
| Example 5 | butadiene based thermoplastic polyurethane | hot melt adhesive | cast thin film | N/A |
| Example 6 | chlorinated polyolefin | solvent based adhesive | solution coating | 3.47 |
| Example 7 | maleic anhydride (MAH) modified chlorinated polypropylene | hot melt adhesive | extrusion coating | 3.33 |
| Example 8 | MAH methyl monoester modified polyisoprene | 100% solid liquid rubber | solution coating | 2.97 |
| Example 9 | MAH modified polyisoprene | 100% solid liquid rubber | solution coating | 4.29 |
| Example 10 | carboxyl modified styrene butadiene random copolymer latex (X-SBR) | water based emulsion | solution coating | 7.34 |
| Example 11 | methyl methacrylate modified natural rubber latex (MMA-NR) | water based emulsion | solution coating | 6.5 |
| Example 12 | 60 (X-SBR)/40 (MMA-NR) mixture | water based emulsion | solution coating | 11.7 |
| Example 13 | 10 (X-SBR)/90 (MMA-NR) | water based emulsion | solution coating | 4.02 |
| Example 14 | resorcinol formaldehyde latex (RFL) | water based emulsion | solution coating | 65.38 |

Referring now to Table 7 below, in Comparative Examples 1 and 2 and Examples 15-18, the effect of the adhesive layer of the composite article on adhesion to rubber is illustrated. Specifically, the adhesion of the composite article to a standard rubber tire carcass plycoat compound is tested. The adhesion test consists of a test of peel strength test to determine the interfacial adhesion between the composite article (or comparative example) and a layer of rubber compound prepared and cured together for 23 minutes at 170° C. The interfacial adhesion between the layers at 100° C. was determined by pulling the first layer away from the other layer at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing. Testing was conducted in accordance with ASTM D4393, with the exception that a sample width of 2.5 cm is used and a clear Mylar plastic film window of a 5 mm width is inserted between the two test samples.

In these Examples/Comparative Examples, the corona treatment, when applied to the base layer, consists of a 115 to 230 volt treatment with a hand-held treatment unit for 8 seconds. Further, the polyethyleneimine treatment, when applied to the base layer, consists of the application of a 5% solids emulsion of polyethyleneimine using a Meyer rod and a drying time of 1 minute at 80° C. to achieve a dry coat weight of 4 g/cm. If applied, the adhesive was applied using a Meyer rod and a drying time of 5 minutes at 120° C. to achieve a coating of about 1 mil.

Comparative Example 1 comprises a base layer with no adhesive layer applied thereon.

Comparative Example 2 comprises a base layer with a treated adhesive comprising a blend of maleic anhydride grafted styrene-ethylene-butylene copolymer (MA-SEBS) and a styrene-isoprene copolymer (SIS) applied thereon.

Example 15 comprises a corona treated base layer and an adhesive layer comprising polyethyleneimine and an adhesive comprising carboxylated styrene-butadiene rubber thereon.

Example 16 comprises a corona treated base layer and an adhesive layer comprising polyethyleneimine and an adhesive comprising a latex of carboxylated styrene-butadiene rubber combined with a natural rubber-polymethylmethacrylate latex.

Example 17 comprises a corona treated base layer and an adhesive layer comprising polyethyleneimine and an adhesive comprising a latex of carboxylated styrene-butadiene rubber or natural rubber-PMMA with standard amounts of curatives (a 0.5% solids sulfur water dispersion and a 2% solids zinc oxide water dispersion dried for 5 minutes at 120° C.).

Example 18 comprises a corona treated base layer and an adhesive layer comprising polyethyleneimine and an RFL adhesive.

Comparative Examples 1 and 2 and Examples 15-18 were prepared for adhesion testing and tested according to the test described above. Results are shown in Table 7 below.

TABLE 7

| Example ID | Adhesion Strength (kgf/inch) |
|---|---|
| Comparative Example 1 | 0.5 |

TABLE 7-continued

| Example ID | Adhesion Strength (kgf/inch) |
| --- | --- |
| Comparative Example 2 | 2.5 |
| Example 15 | 7.3 |
| Example 16 | 11.7 |
| Example 17 | 3.2 |
| Example 18 | 65.4 |

Referring now to Table 7, all of the Examples exhibit improved adhesion to rubber over the Comparative Examples. Further, Example 18, which comprises a corona treated base layer and an adhesive layer comprising polyethyleneimine and an RFL adhesive demonstrates the best adhesion to rubber of all of the Examples tested.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A composite article comprising a base layer, an adhesive layer disposed thereon, and a natural rubber latex layer, said composite article comprising:
   A) said base layer comprising:
      i. a reaction product of:
         a. a polyamide; and
         b. an anhydride-functional copolymer; and
      ii. an ionomer; and
   B) said adhesive layer comprising a cationic polymer and an adhesive; and
   C) said natural rubber latex layer disposed on said adhesive layer,
   wherein said adhesive layer and said natural rubber latex layer are present in said composite article in a thickness ratio of from about 4:1 to about 20:1.

2. A composite article as set forth in claim 1 wherein said polyamide is selected from the group of polyamide 6, polyamide 66, polyamide 6/66, and combinations thereof.

3. A composite article as set forth in claim 1 wherein said anhydride-functional copolymer comprises an a-olefin graft copolymer comprising the reaction product of ethylene and 1-octene, grafted with units derived from maleic anhydride.

4. A composite article as set forth in claim 1 wherein said ionomer is an at least partially neutralized salt of a copolymer derived from ethylene and an a, (3-unsaturated monocarboxylic acid.

5. A composite article as set forth in claim 1 wherein said base layer has a specific gravity of from 0.8 to 1.15 g/cm3.

6. A composite article as set forth in claim 1 wherein said cationic polymer is selected from the group of a polyethyleneimine, a polyvinylamine, a polyvinylformamide, and combinations thereof.

7. A composite article as set forth in claim 1 wherein said cationic polymer is a polyethyleneimine.

8. A composite article as set forth in claim 1 wherein said cationic polymer has a weight average molecular weight (Mw) of from about 500 to about 3,500,000.

9. A composite article as set forth in claim 1 wherein said adhesive comprises a resorcinol-formaldehyde-latex (RFL) adhesive.

10. A composite article as set forth in claim 1 wherein said adhesive layer is present in an amount of from about 0.1 to about 5 parts by weight and said base layer is present in an amount of from about 95 to about 99.9 parts by weight, per 100 parts by weight of said composite article.

11. A method of forming a composite article according to claim 1, said method comprising the steps of
   mixing the polyamide composition comprising the polyamide, the anhydride-functional copolymer, and the ionomer to form the base layer comprising the reaction product of the polyamide and the anhydride-functional copolymer and the ionomer; and
   applying the cationic polymer and the adhesive to the base layer to form the adhesive layer thereon.

12. A method as set forth in claim 11 further comprising the step of applying the natural rubber latex to the adhesive layer to form the natural rubber latex layer thereon.

13. A method as set forth in claim 11 wherein the polyamide is present in the polyamide composition in an amount of from about 30 to about 75 parts by weight, the anhydride-functional copolymer is present in the polyamide composition in an amount of from about 5 to about 55 parts by weight, and the ionomer is present in the polyamide composition in an amount of from about 5 to about 55 parts by weight, per 100 parts by weight of said polyamide composition.

14. A method as set forth in claim 11 wherein the cationic polymer is selected from the group of a polyethyleneimine, a polyvinylamine, a polyvinylformamide, and combinations thereof.

15. A method as set forth in claim 11 wherein the adhesive comprises a resorcinol-formaldehyde-latex (RFL) adhesive.

16. A method as set forth in claim 11 wherein the cationic polymer is a polyethyleneimine and/or the resorcinol-formaldehyde-latex (RFL) comprises a resorcinol-formaldehyde resin, a styrene-butadiene rubber, and a vinylpyridine-styrene-butadiene rubber.

17. A method as set forth in claim 11 wherein the step of applying the cationic polymer and the adhesive to the base layer to form the adhesive layer is further defined as applying an aqueous dispersion of the cationic polymer on a surface of the base layer and subsequently applying the adhesive to the surface having the cationic polymer thereon to form the adhesive layer.

18. A method as set forth in claim 11 further comprising the step of corona treating the base layer.

19. A method as set forth in claim 11 wherein the base layer is formed via a cast film extrusion process or a blown film extrusion process.

* * * * *